United States Patent [19]
Nack et al.

[11] 3,900,096
[45] Aug. 19, 1975

[54] FEEDING MECHANISM FOR WRAPPING MACHINE

[75] Inventors: Michael R. Nack; Donald C. Crawford, both of Green Bay, Wis.

[73] Assignee: FMC Corporation, San Jose, Calif.

[22] Filed: Aug. 16, 1973

[21] Appl. No.: 388,880

Related U.S. Application Data

[63] Continuation of Ser. No. 198,233, Nov. 12, 1971, abandoned.

[52] U.S. Cl. ............... 198/23; 198/20 R; 198/34; 198/102; 198/171; 214/1 BA
[51] Int. Cl. ............................................ B65g 47/52
[58] Field of Search ....... 198/20 R, 23, 34, 76, 102, 198/171–174; 214/1 BA, 8.5 G

[56] References Cited
UNITED STATES PATENTS

| | | | |
|---|---|---|---|
| 1,954,278 | 4/1934 | Adams | 198/23 |
| 2,153,039 | 4/1939 | Darling | 198/23 |
| 2,603,339 | 7/1952 | Malhiot | 198/23 |
| 2,616,550 | 11/1952 | Rowe | 198/34 |
| 2,912,093 | 11/1959 | Lauck | 198/20 |
| 3,166,181 | 1/1965 | Rutkus et al. | 198/102 |
| 3,217,860 | 11/1965 | Ganz | 198/171 |
| 3,453,800 | 7/1969 | Mahncke | 198/20 R |
| 3,533,519 | 10/1970 | Anderson | 198/20 R |
| 3,615,001 | 10/1971 | Temple | 198/20 R |
| 3,701,407 | 10/1972 | Kulig | 198/20 R |

*Primary Examiner*—Evon C. Blunk
*Assistant Examiner*—Jeffrey V. Nase
*Attorney, Agent, or Firm*—C. E. Tripp

[57] ABSTRACT

This application discloses a horizontal form, fill and seal machine associated with a feeding mechanism which is adapted to propel the individual articles to a packaging conveyor at a very high rate of speed and yet insure that the impact or force applied by the fi-lights of the feeding mechanism are distributed over a large area in order to prevent damage or destruction to fragile food products. To fulfill this requirement an article in-feed conveyor is associated with an overhead angularly disposed transfer conveyor that transports and imparts a substantial velocity to the article. The article thereafter is deposited into the packaging conveyor of the wrapping machine which further increases the article velocity but the added increment of velocity coupled with the article contact area of the transfer conveyor flights prevents damage to the article.

5 Claims, 11 Drawing Figures

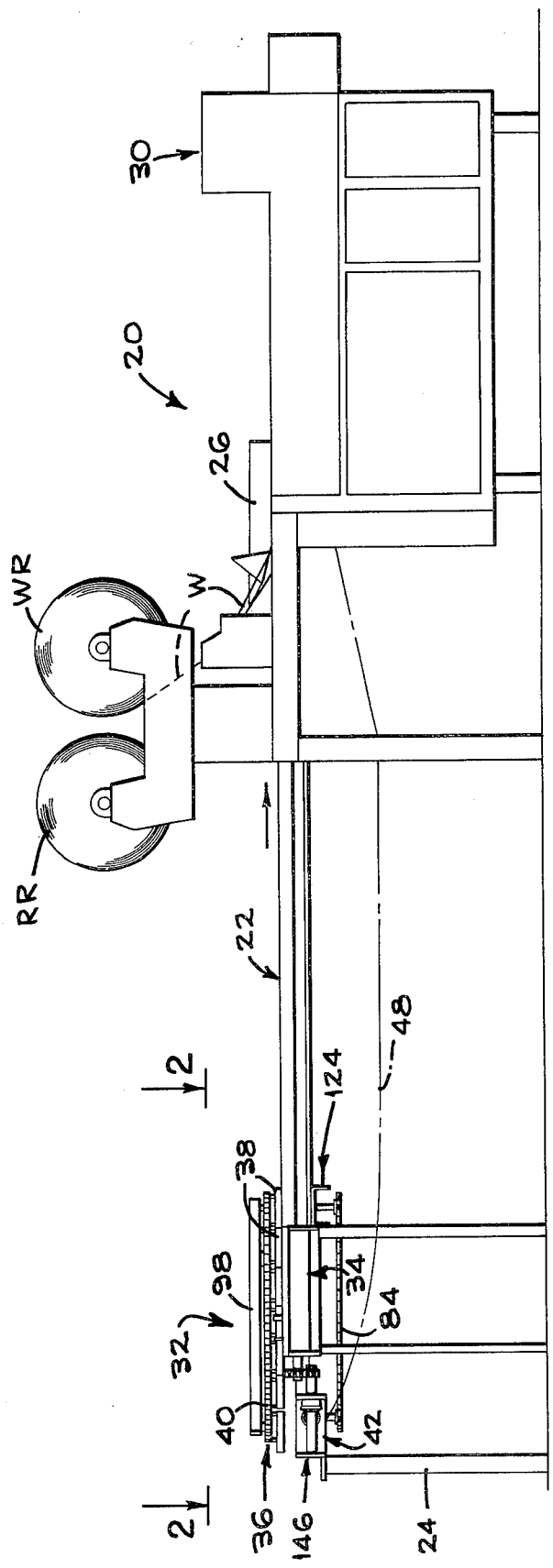

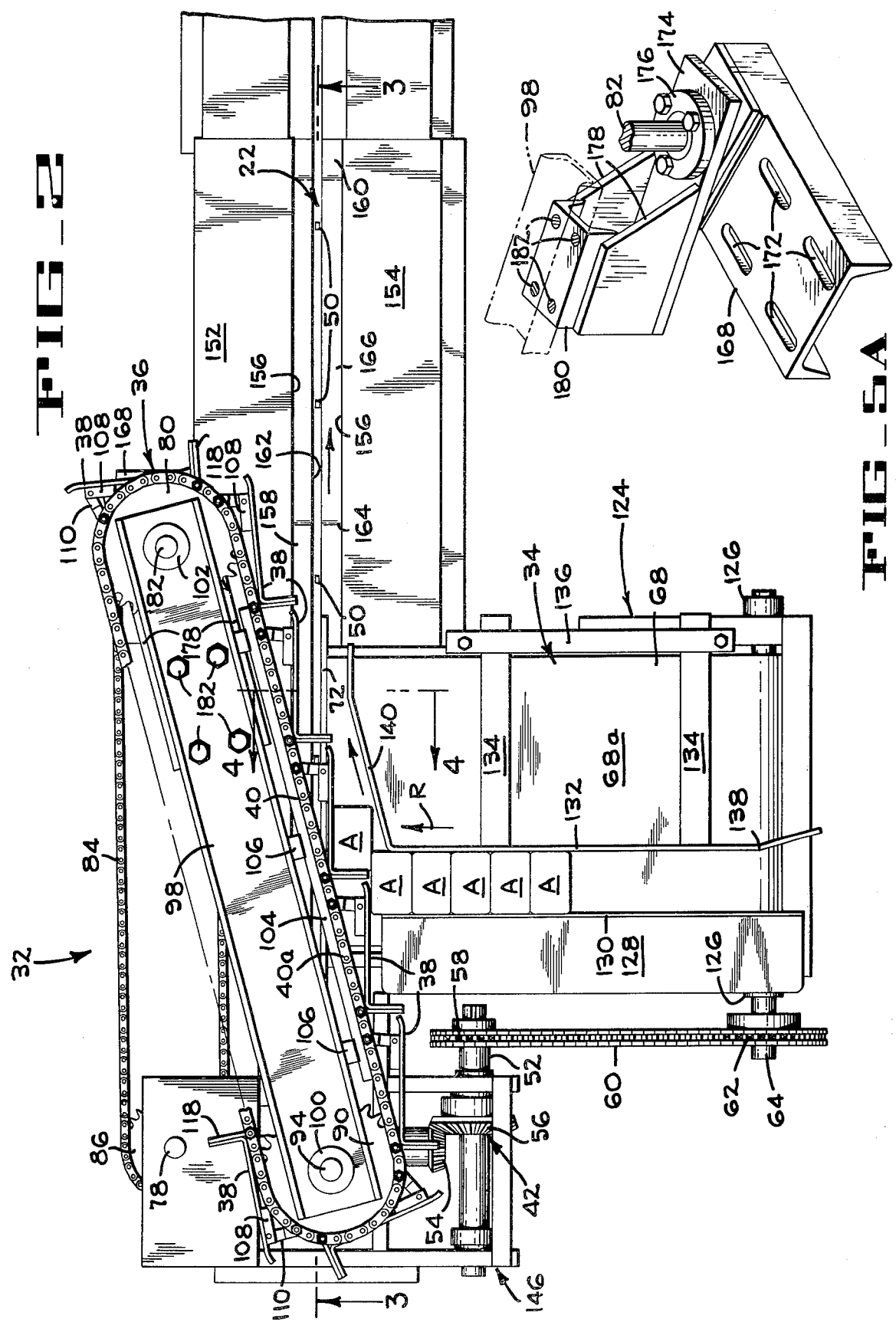

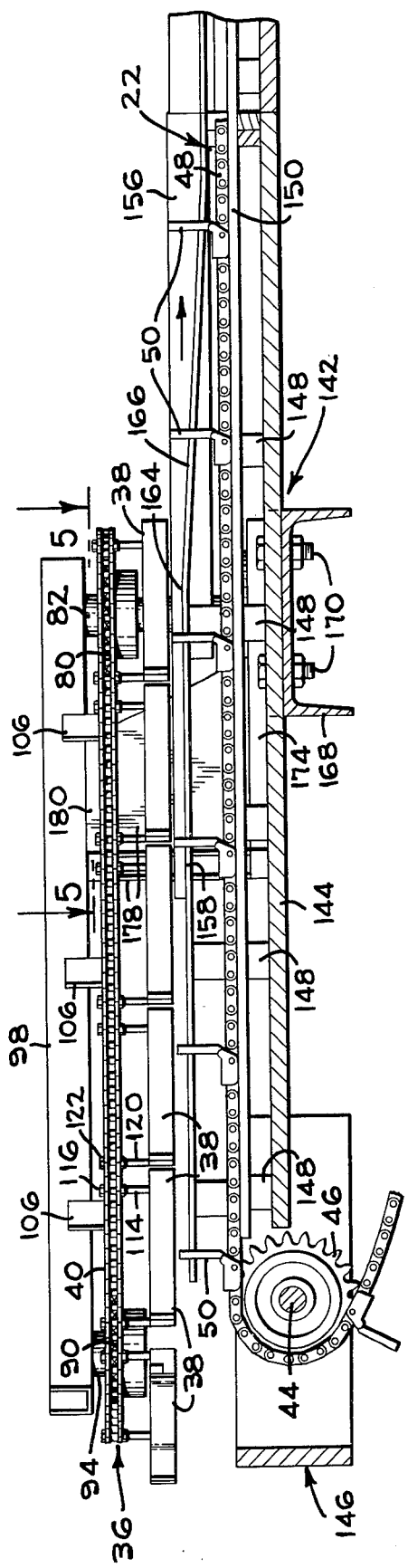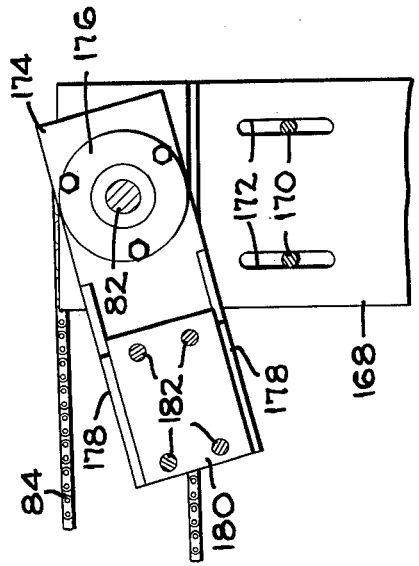

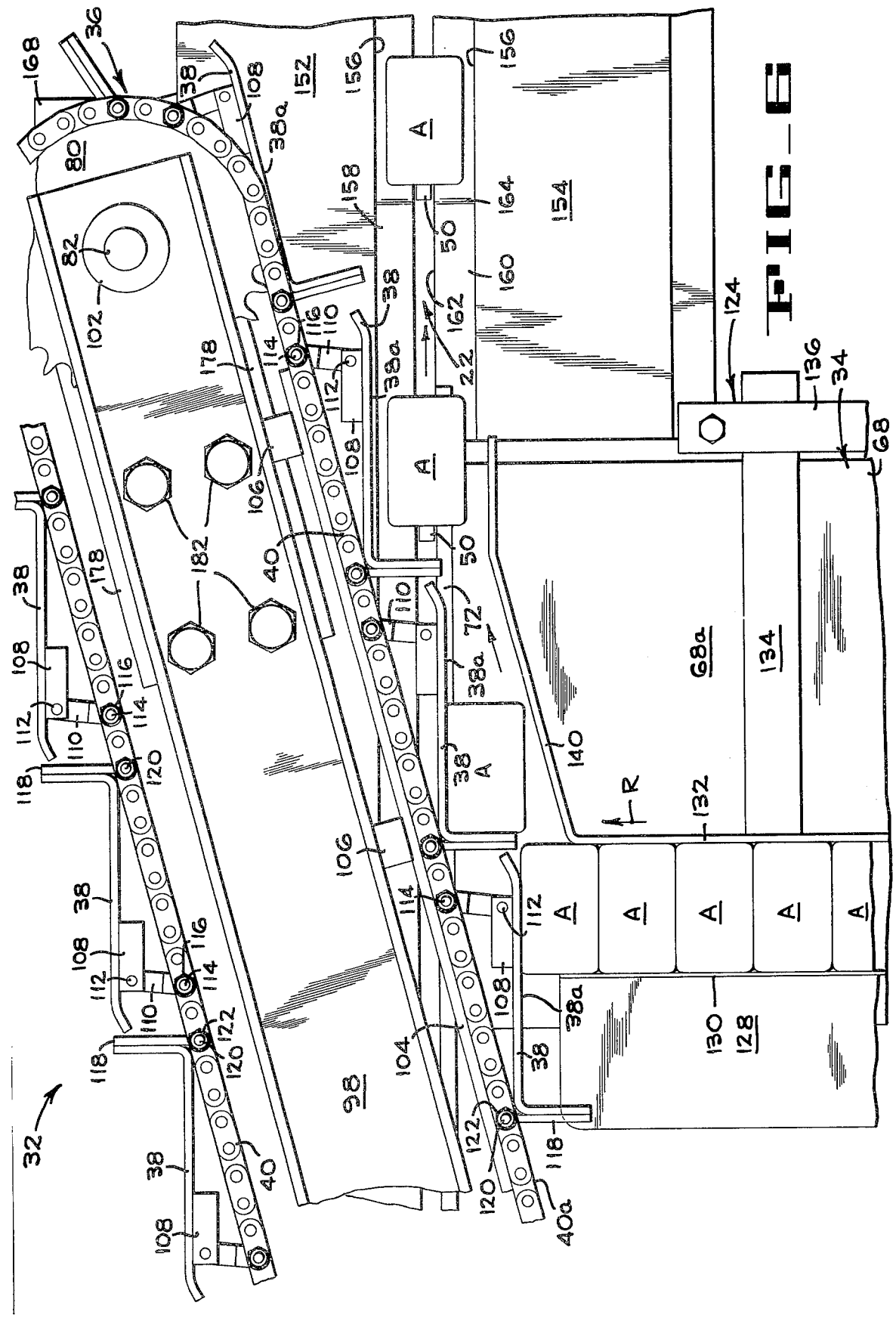

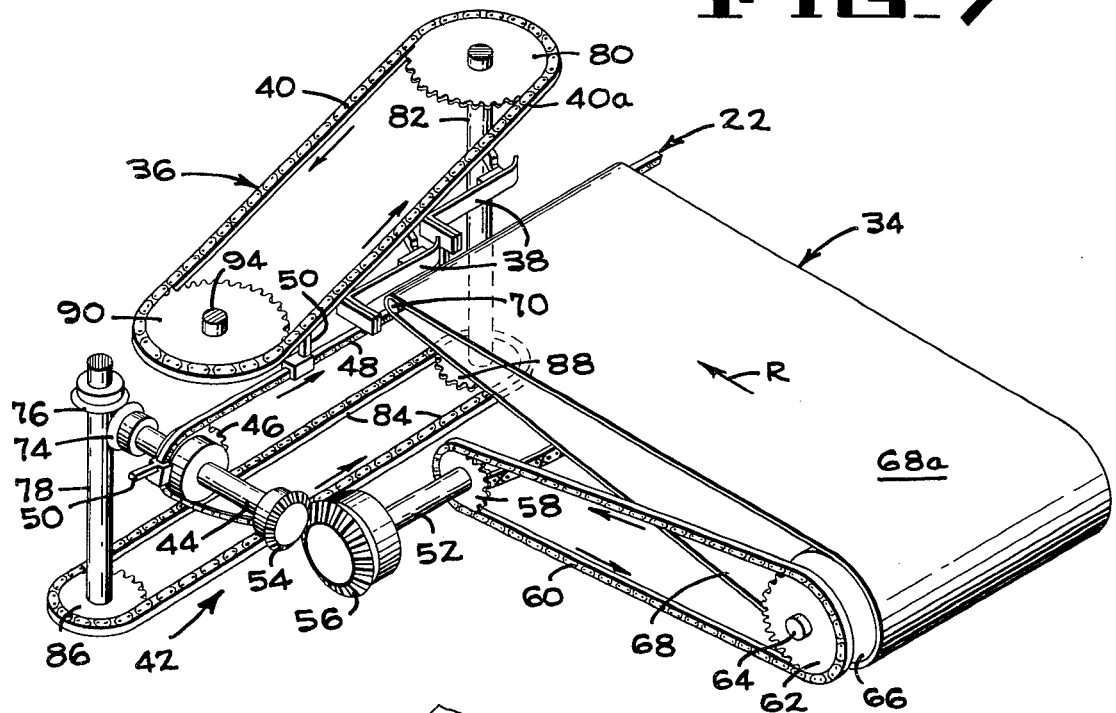
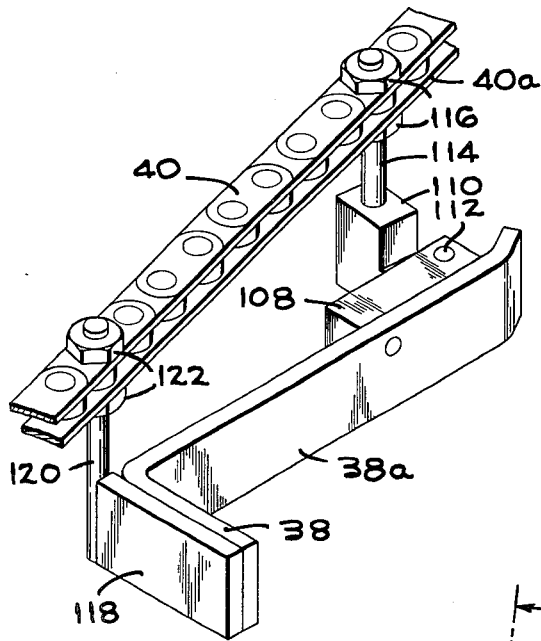
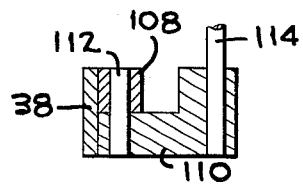
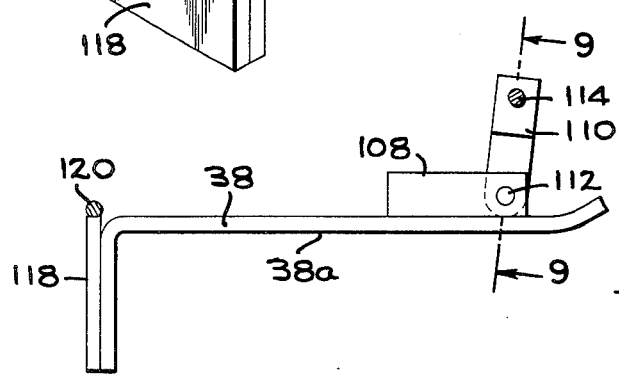

FEEDING MECHANISM FOR WRAPPING MACHINE

This is a continuation, of application Ser. No. 198,233, filed Nov. 12, 1971 and now abandoned.

BACKGROUND OF THE INVENTION

Problems encountered in feeding fragile food products to wrapping machines at commercial speeds gives rise to two significant problems; the first being that the force applied by in-feed lugs of the packaging conveyor to fragile food products, particularly where rapid acceleration is necessary, causes damage to the product, and secondly, when it is necessary to feed articles by a supply conveyor, which is substantially at 90° to the packaging path, it is difficult to synchronize article supply with lugs of the packaging conveyor. The usual situation is that more than an occasional lug has not been supplied with an article resulting, particularly in a horizontal form, fill and seal machine, in waste of expensive film and obviously reduced production.

It has been proposed to solve this problem by providing a belt supply conveyor with a constant velocity and so timed that the articles discharged thereby arrive at the packaging conveyor at the appropriate time to be engaged by a lug on said conveyor. It has also been proposed to provide a side supply conveyor driven intermittently and presumably timed to feed the articles so that the in-feed dog of the packaging machine conveyor belt picks up an article at the appropriate time. Another proposal involves withdrawing the articles from a storage magazine by a supply conveyor having a series of lugs synchronized with the lugs of the packaging conveyor. The common problem with the above mentioned feeder types is that abrupt changes in velocity cause damage to the articles because the contact area between the article and the packaging conveyor lugs is very small causing damage to the food product. An example of products which encounter these problems are chocolate-covered candy bars which suffer cracking and flaking due to the shock loads imposed by the packaging conveyor dogs.

SUMMARY OF THE INVENTION

In response to the above problems one of the features of the present invention involves providing an article supply conveyor associated with an intermediate transfer conveyor that removes successive articles therefrom and imparts a substantial velocity, substantially equal to the velocity of the packaging conveyor. The transfer conveyor of the present invention is provided with a series of L-shaped lugs or pusher flights carried in an orbital path by a roller chain. The roller chain is mounted on the frame overlying the packaging conveyor thus allowing a relatively unlimited area to the flights which in some cases will be greater than the area of the article engaged thereby. Accordingly, the rapid increase in velocity imparted to the article by the transfer conveyor is distributed over a substantial area which of course reliably prevents damage to the article.

The general arrangement of the feeding mechanism of the present invention makes it substantially unaffected by any excess in-feed pressure, in the art, usually referred to as backlog pressure, because the degree of crowding experienced by the articles has no effect on the feeding function of the transfer conveyor. As a result of the present invention considerably superior control of the article is achieved and a much higher cycle rate of the wrapping machine is possible.

BRIEF DESCRIPTION OF THE DRAWINGS

FIG. 1 is a side elevation of a wrapping machine incorporating the novel feed mechanism of the present invention, FIG. 2 is a fragmentary enlarged plan of the feeding mechanism of the present invention when viewed along the line 2—2 of FIG. 1, FIG. 3 is a section taken substantially along the line 3—3 of FIG. 2, FIG. 4 is a section taken along the line 4—4 of FIG. 2, FIG. 5 is a fragmentary horizontal section taken along the line 5—5 of FIG. 3, FIG. 5A is a perspective view of FIG. 5, FIG. 6 is a further enlarged fragmentary section of FIG. 2 showing in greater detail the action of the feeding mechanism, FIG. 7 is a perspective diagrammatic illustrating the integrated drive arrangement of the supply conveyor and the transfer conveyor, FIG. 8 is a greatly enlarged perspective of a flight associated with the transfer conveyor, FIG. 9 is a section taken along the line 9—9 of FIG. 10, and FIG. 10 is a plan of a lug of the transfer conveyor.

DESCRIPTION OF THE PREFERRED EMBODIMENT

A typical packaging machine utilizing the feeding mechanism of the present invention is shown in FIG. 1 and is identified by the numeral 20. The major components of the machine comprise a packaging conveyor 22 supported by a plurality of legs 24. The conveyor operates to feed a single file of longitudinally spaced articles to a web former 26 which derives web material from a web roll WR mounted on an unwind stand 28. The unwind stand may include provision for a reserve web roll noted by RR.

At the web former 26 the web strip W is continually constrained to define a tube within which the articles from the conveyor 22 are deposited and thereafter the lateral edges of the web W are heat sealed. Thereafter the web, with the articles therein, is transported to a transverse severing and sealing station 30, preferably including heated rotary jaws, that engage the tubular web between the longitudinally spaced articles thereby producing individually wrapped articles.

The novel feeding mechanism of the present invention is generally indicated by the numeral 32 and it will be observed by inspection of FIG. 1 that it is located, and as will appear hereinafter, is drivingly connected to the packaging conveyor 22 so that all the conveyors are synchronized.

The novel feeding mechanism of the present invention is shown in enlarged plan in FIG. 2 and reference thereto will reveal a belt supply conveyor 34 on which is disposed a single file of articles A which are transported in the direction of the arrow R toward the packaging conveyor 22. Overlying the packaging conveyor 22, and angularly oriented with respect to the conveyor 22 and the conveyor 34, is a transfer conveyor 36 provided with a series of L-shaped lugs 38 connected to a roller chain 40. The supply conveyor 34 and the transfer conveyor 36 are drivingly connected by a drive train 42 whose input is derived from the drive for the packaging conveyor 22. By driving the transfer conveyor 36 and the supply conveyor 34 from the packaging conveyor 22 their action can be synchronized so that the articles A can be presented to each successive feeding lug of the packaging conveyor.

The common drive for the supply conveyor 34, the packaging conveyor 22 and the transfer conveyor 36 is shown in diagrammatic perspective in FIG. 7. Reference to this figure will reveal a cross shaft 44 on which is keyed a sprocket 46 driven by the packaging conveyor roller chain 48 that has pinned thereto a series of spaced lugs 50 which serve to transport the articles to be packaged to the web former 26. The shaft 44 establishes driving relation with a shaft 52 by means of a bevel gear 54, keyed to the shaft 44, and bevel gear 56, keyed to the shaft 52. The shaft 52 also has fixed thereon a sprocket 58 driving a chain 60 which in turn drives a sprocket 62 keyed to a shaft 64. The shaft 64 also mounts a flat belt pulley 66 for driving a flat conveyor belt 68 in the direction of the arrow R. The belt 68 supports a plurality of articles A (FIG. 2) for delivery to the L-shaped lugs 38 of the transfer conveyor 36. The belt 68 is trained about a small elongate pulley 70 (FIG. 4) which permits the conveying reach 68a of the belt 68 to be positioned closely adjacent the article feeding lugs 50 of the packaging conveyor 22.

Examination of FIG. 4 will reveal the provision of a ramp 72, defining a continuation of the feeding reach 68a, that provides support for the individual articles until they are discharged into the packaging conveyor 22.

Referring again to FIG. 7, the illustrated drive is connected to drive the transfer conveyor 36 by means of a bevel gear 74, keyed to the shaft 44, and meshing with a bevel gear 76 suitably secured to a vertical shaft 78. The transfer conveyor 36 includes a drive sprocket 80 secured to a shaft 82 which is driven by a roller chain 84 interconnecting a sprocket 86, mounted on the lower end of the vertical shaft 78, and a sprocket 88, mounted on the lower end of the shaft 82. The sprocket 80 drives an idler sprocket 90 by means of the chain 40. The sprocket 90 is keyed to a stub shaft 94.

As shown in FIGS. 2 and 3, a beam 98 which can take the form of a channel iron, is provided with bearings 100 and 102 for rotatably supporting the upper ends of the shafts 94 and 82 respectively. The beam 98 constitutes the main frame of the transfer conveyor 36.

The article feeding reach of the chain 40, identified as 40a, runs along a guide rail 104 carried by the beam 98 through a series of interconnecting brackets 106. The rail 104 serves to constrain the feed reach 40a to maintain straight line motion.

The manner preferred in mounting the L-shaped lugs 38 to the chain 40 is illustrated in enlarged perspective in FIG. 8. Reference thereto will reveal that a block 108 is secured to the long leg of the bracket and that a link 110 is pivotally connected thereby by a pin 112. The link 110 is connected to the chain 40 by a stud 114 having one end threaded for reception of nuts 116 firmly holding the stud 114 to the chain 92. The short leg of the lug 38 is secured to a plate 118 which is attached, preferably by welding, to another stud 120 also having its upper end threaded for reception of nuts 122. According to this construction it can be seen that each of the lugs 38 is firmly fixed to the chain 92 but that the pivotal connection defined by the pin 112 provides the degree of articulation required for the lugs to freely progress around the sprockets 80 and 90.

The supply conveyor 34 defines a feed direction substantially normal to the feed direction of the packaging conveyor 22. The supply conveyor is supported by a frame structure 124 providing suitable bearings 126 for the shaft 64 and bearings (not shown) for the small diameter pulley 70. Overlying one edge of the belt conveyor 68 is an elongate shield 128 formed with an upstanding edge 130 providing an abutment in engagement with one edge of the articles A. Also overlying the belt conveyor 68 is a laterally adjustable fence 132 mounted for lateral adjustment by a pair of bars 134 extending through slots formed in a rail 136. Means are provided on the rail 136 for maintaining the lateral adjustment of the fence 132.

The article in-feed end of the fence 132 is bent at 138 to define an entrance throat for the articles. The discharge end of the fence 132 is however formed with a portion 140 defining an acute angle relative to the feed line of the packaging conveyor 22. By mounting the fence 132 so that it is laterally movable by virtue of the bars 134 it is obvious that articles of different dimension can be conveyed by supply conveyor 34.

The transfer conveyor 36 is also disposed at substantially the same acute angle with respect to the feed line of the packaging conveyor 22 as the fence portion 140. The feed chain 48 of the packaging conveyor 22 is driven by the main drive of the packaging machine 20. A frame structure 142 is provided for supporting the chain 48 with such structure being in part shown in FIG. 3. The support structure 142 comprises a base plate 144 mounting a plurality of braces, collectively identified by 146, rotatably supporting the shafts 44, 52 and 78. The base plate 144 has a series of longitudinally spaced spacer blocks 148 fixed thereto supporting an elongate narrow plate 150 providing a support for the feed run of the packaging conveyor chain 48. The lugs 50 which are pinned to the chain 48 at regularly spaced intervals, project generally normally with respect to the plate 150. Cover plates 152 and 154 overlie and are suitably supported by the base plate 144. The cover plates are formed with downturned edges 156, typically shown in FIG. 4, to define a trough within which the articles fed by the packaging conveyor are guided along a rectilinear path.

To guard against tumbling or disorientation of the articles as they are deposited in the packaging conveyor 22 by the transfer conveyor 36, there is provided a pair of support plates 158 and 160, having one edge secured to the downturned walls 156. The plates define a narrow slot 162 through which the lugs 50 project. As shown best in FIG. 3 each of the plates 158 and 160 (only the plate 158 being shown) is bent at 164 to provide a gradually downwardly inclined ramp portion 166 which effectively lowers the elevation of the article relative to the pushers 150 as the article progresses toward the web former 26.

By forming the plates 158 and 160 in the above described manner and by providing the small diameter elongate roll 70 small changes in elevation experienced by the articles as they are transferred from the supply conveyor 34 to the packaging conveyor 22 minimizes any tendency of the article to tumble or become disoriented during the transfer.

The transfer conveyor 36 is carried by the packaging conveyor 22 and its mounting is so arranged so that it can be adjusted to change its inclination relative to the feed line of the package conveyor 22 and can be moved laterally with respect thereto which may be dictated by the size of the article being processed. FIGS. 3, 5 and 5A illustrate one way in which the transfer conveyor can be connected to the packaging conveyor 22 to fulfill the adjustability requirements. Referring first to FIG. 3 there is shown a structural channel 168 rigidly secured to the base plate 144 by bolts 170. Inspection of FIGS. 5 and 5A will reveal that the bolts 170 extend through elongated slots 172 that serve to allow lateral adjustment of the channel 168 relative to the packaging conveyor 22. The portion of the channel 168 extending beyond the base plate 144 is provided with a bore through which extends the drive shaft 82. Overlying this portion of the channel 168 is a heavy plate 174 mounting a flange bearing 176 rotatably supporting the shaft 82. The heavy plate 174 has rigidly attached thereto laterally aligned gussets 178, generally in the form of a truncated triangle, interconnected at their upper portions by a short structural channel 180. This channel 180 constitutes a mounting pad for the beam 98 which is secured thereto by a plurality of bolts 182.

By means of the above described transfer conveyor support structure, its ease of adjustment, whether it be its angle of inclination or laterally, is readily accomplished by virtue of the elongated slots 172. Moreover the shaft 82 provides a pivot point for rotating the plate 174 relative to the channel 168.

By providing the transfer conveyor 36 which is synchronized with the operation of the packaging conveyor 22 the speed ratio between these two conveyors can be arranged, depending upon the size and delicacy of the article being packaged, to contribute any desired ratio of velocity. In those instances where fragile articles are being processed the article transporting surface 38a of the lug 38 may be made at least as large or larger in area and configuration as the area of the face of the article engaged thereby. By operating the supply conveyor 34 at slightly greater speed than the rate at which the articles are removed therefrom the row of articles can be urged or crowded toward the lugs 38 so that the leading one is in position to be transported generally transversely relative to the conveyor 34.

The concept of the present invention in providing the transfer conveyor located at acute angle with respect to the packaging conveyor 22 avoids the problems encountered with many feeders resulting from backlog pressure on the article supply. By generally tangentially stripping the leading article from the row of articles on the supply conveyor backlog pressure or crowding in fact assists in insuring article pickup by each of the lugs 38.

In the event the articles exhibit any tendency to skew with respect to the lugs 38 the fence portion 140 prevents such an occurrence. As the articles are being transported by the lugs 38 they pass over the ramp 72 (FIG. 4) which defines a continuation of the conveying reach 68a providing a substantially continuous supporting surface until the article is deposited on the packaging conveyor 22. As is recognized the timing of the lugs 38 on the transfer conveyor and the lugs 50 on the packaging conveyor is such that, instantaneously, the article faces are slightly in advance of the lugs 50 and are engaged by the lugs 50 when the articles have been "lost" by the lugs 38.

Although the best mode contemplated for carrying out the present invention has been herein shown and described, it will be apparent that modification and variation may be made without departing from what is regarded to be the subject matter of the invention.

We claim:

1. A conveying apparatus for gently transferring a foremost article from an abutting row of articles supported on a feed conveyor onto a packing conveyor disposed generally normal to the path of said feed conveyor comprising: a transfer conveyor having an endless chain which includes a linear transfer run disposed diagonally across said feed conveyor and said packing conveyor; means defining a plurality of article engaging pushers secured to said chain at spaced intervals; said article engaging pushers each including a first article engaging wall disposed parallel to said feed conveyor and a second article engaging wall disposed parallel to said packing conveyor when said pushers are in said transfer run, and with said second wall of each following pusher disposed closely adjacent said first wall of each leading pusher along said transfer run, and means for continuously driving said feed conveyor and said packing conveyor and for driving said transfer conveyor at a speed causing said second article engaging wall to resist movement of the foremost article while the abutting row of articles moves continuously in the direction of movement of said feed conveyor during transfer of articles therefrom but at a rate slower than that of said feed conveyor, and simultaneously therewith causing said first article engaging wall to move the transferred article transversely of said abutting row of articles at a speed slightly slower than that of said packing conveyor until disengaged from said transfer conveyor, the article engaging pusher which follows the pusher that engages said foremost article being positioned so that the next following article in said abutting row of articles engages the second wall of said following pusher prior to moving said foremost article out of engagement with said next following article on said feed conveyor.

2. A conveying apparatus according to claim 1 wherein said article engaging pushers are evenly spaced on said chain.

3. A conveying apparatus according to claim 1 wherein said packing conveyor includes spaced stationary article supporting plates for slidably supporting the articles, an endless packing conveyor chain, a plurality of evenly spaced lugs secured to said packing conveyor chain and projecting upwardly between said support plates, each lug being associated with one of said article engaging pushers when in said transfer run during article transfer and being spaced from the associated first article engaging wall until after the article has been moved off the feed conveyor onto said plates.

4. A conveying apparatus according to claim 3 wherein said lug engages and moves the articles away from said associated first article engaging wall before the wall has moved out of the path of travel of the articles on the packing conveyor.

5. A conveying apparatus according to claim 1 and additionally comprising stationary guide means disposed substantially parallel to said transfer run of said transfer conveyor for urging the articles toward the second article engaging surface of said pushers after the articles are moved off said feed conveyor onto said packing conveyor.

* * * * *

UNITED STATES PATENT OFFICE
CERTIFICATE OF CORRECTION

PATENT NO. : 3,900,096
DATED : August 19, 1975
INVENTOR(S) : MICHAEL R. NACK and DONALD C. CRAWFORD It is certified that error appears in the above-identified patent and that said Letters Patent are hereby corrected as shown below:

Column 3, line 58 change "thereby" to --thereto--.

Signed and Sealed this twenty-fourth Day of February 1976

[SEAL]

Attest:

RUTH C. MASON
Attesting Officer

C. MARSHALL DANN
Commissioner of Patents and Trademarks